(12) United States Patent
Hayashita et al.

(10) Patent No.: US 9,334,776 B2
(45) Date of Patent: May 10, 2016

(54) CONTROL DEVICE FOR INTERNAL COMBUSTION ENGINE

(71) Applicants: Go Hayashita, Ebina (JP); Takanori Sasaki, Susono (JP); Keiichiro Aoki, Sunto-gun (JP)

(72) Inventors: Go Hayashita, Ebina (JP); Takanori Sasaki, Susono (JP); Keiichiro Aoki, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/429,143

(22) PCT Filed: Sep. 20, 2012

(86) PCT No.: PCT/JP2012/074034
§ 371 (c)(1),
(2) Date: Mar. 18, 2015

(87) PCT Pub. No.: WO2014/045367
PCT Pub. Date: Mar. 27, 2014

(65) Prior Publication Data
US 2015/0247434 A1 Sep. 3, 2015

(51) Int. Cl.
*F01N 3/18* (2006.01)
*F01N 3/08* (2006.01)
(Continued)

(52) U.S. Cl.
CPC ............ *F01N 3/0842* (2013.01); *F01N 3/0835* (2013.01); *F01N 3/0864* (2013.01); *F01N 3/101* (2013.01); *F01N 3/18* (2013.01); *F01N 11/007* (2013.01); *F02D 41/1441* (2013.01); *F02D 41/1454* (2013.01); *F02D 41/1456* (2013.01); *F02D 41/1495* (2013.01);
(Continued)

(58) Field of Classification Search
CPC ... F01N 3/101; F01N 11/00; F01N 2560/025; F01N 2560/14; F01N 2900/0416; F01N 2900/1402; F01N 2900/1624; F02D 41/0295; F02D 41/042; F02D 41/123; F02D 41/1408; F02D 41/1456; F02D 41/1495; Y02T 10/47; Y02T 10/48
USPC .......................... 60/276, 277, 285, 294, 299
See application file for complete search history.

(56) References Cited

U.S. PATENT DOCUMENTS 5,752,387 A * 5/1998 Inagaki ................ B60H 1/3208
123/339.17
2007/0220862 A1 9/2007 Suehiro et al.
(Continued)

FOREIGN PATENT DOCUMENTS

JP H06-280662 A 10/1994
JP H09-287504 A 11/1997
(Continued)

*Primary Examiner* — Jorge Leon, Jr.
(74) *Attorney, Agent, or Firm* — Kenyon & Kenyon LLP

(57) ABSTRACT

In an exhaust path of an internal combustion engine, a catalyst, a first air-fuel ratio sensor installed upstream thereof, and a second air-fuel ratio sensor installed downstream thereof are disposed. An air-fuel ratio of the engine is controlled to a rich air-fuel ratio or a lean air-fuel ratio. In a state that is determined as a state where the catalyst stores oxygen to an upper limit after the air-fuel ratio is switched to the lean air-fuel ratio from the rich air-fuel ratio, or a state where the catalyst releases oxygen to a lower limit after the air-fuel ratio is switched to the rich air-fuel ratio from the lean air-fuel ratio, a first output from the first air-fuel ratio sensor, and a second output from the second air-fuel ratio sensor are detected and based on a difference therebetween the output of the first air-fuel ratio sensor is corrected.

14 Claims, 7 Drawing Sheets

(51) Int. Cl.
*F02D 41/22* (2006.01)
*F01N 3/10* (2006.01)
*F01N 11/00* (2006.01)
*F02D 41/24* (2006.01)
*F02D 41/04* (2006.01)
*F02D 41/12* (2006.01)
*F02D 41/14* (2006.01)
*F02D 41/02* (2006.01)

(52) U.S. Cl.
CPC ......... *F02D 41/222* (2013.01); *F02D 41/2474* (2013.01); *F01N 2550/02* (2013.01); *F01N 2560/025* (2013.01); *F01N 2560/14* (2013.01); *F01N 2570/14* (2013.01); *F01N 2570/16* (2013.01); *F01N 2900/0416* (2013.01); *F01N 2900/1402* (2013.01); *F01N 2900/1624* (2013.01); *F02D 41/0295* (2013.01); *F02D 41/042* (2013.01); *F02D 41/123* (2013.01); *F02D 41/1408* (2013.01); *Y02T 10/22* (2013.01); *Y02T 10/40* (2013.01); *Y02T 10/47* (2013.01); *Y02T 10/48* (2013.01)

(56) References Cited

U.S. PATENT DOCUMENTS

2009/0313974 A1* 12/2009 Iida ..................... F01N 11/007
  60/287
2012/0324864 A1* 12/2012 Krengel ............. F02D 41/1441
  60/274
2014/0005882 A1 1/2014 Aoki et al.

FOREIGN PATENT DOCUMENTS

| JP | 2004-036464 A | 2/2004 |
| JP | 2007-285288 A | 11/2007 |
| JP | 2011-117462 A | 6/2011 |
| WO | 2012/160651 A1 | 11/2012 |

* cited by examiner

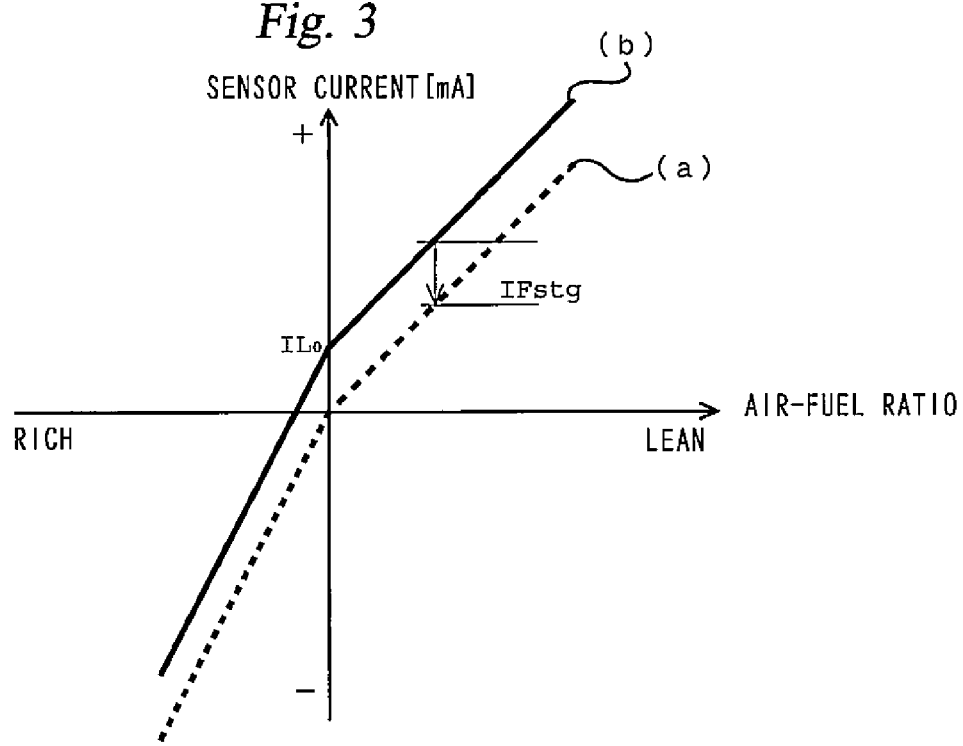
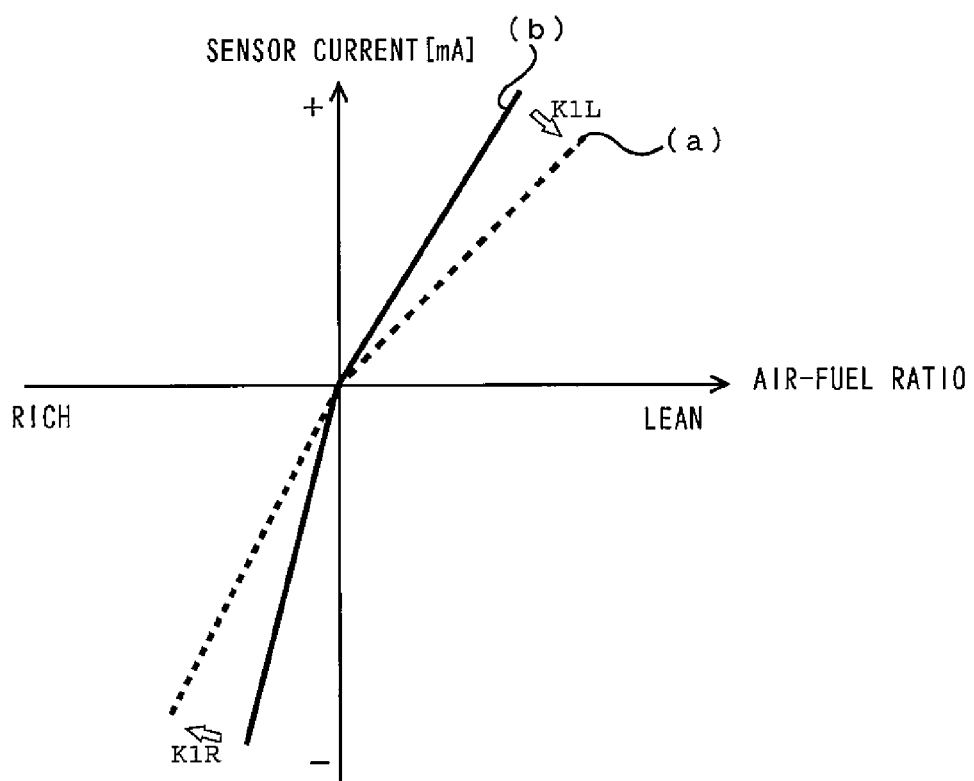

Fig. 7B

| | |
|---|---|
| S202 | PRECONDITIONS ARE ESTABLISHED? |
| S204 | F/B CONTROL TO RICH TARGET AIR-FUEL RATIO |
| S206 | REFERENCE TIME PERIOD ELAPSES? |
| S208 | DETECT Fr OUTPUT IF, Rr OUTPUT IR |
| S210 | DETECT N TIMES? |
| S212 | F/B CONTROL TO LEAN TARGET AIR-FUEL RATIO |
| S214 | REFERENCE TIME PERIOD ELAPSES? |
| S216 | DETECT Fr OUTPUT IF, Rr OUTPUT IR |
| S220 | CALCULATE OUTPUT AVERAGE VALUES IFR, IRR |
| S222 | |IFR-IRR|>REFERENCE VALUE? |
| S226 | CALCULATE OUTPUT AVERAGE VALUES IFL, IRL |
| S228 | |IFR-IRL|>REFERENCE VALUE? |

S302 PRECONDITIONS ARE ESTABLISHED?
S304 DURING F/C OPERATION?
S306 PREDETERMINED TIME ELAPSES?
S308 DETECT Fr OUTPUT IF
S310 DETECT N TIMES?
S312 CALCULATE OUTPUT AVERAGE VALUE IFA
S314 CALCULATE K2L(K2L=IA/(IFA×K1L))
S316 CALCULATE K2R(K2R=K2L×k)
S318 STORE K2L, K2R

S402 PRECONDITIONS ARE ESTABLISHED?
S420 CALCULATE A/F IN FRONT AND BEHIND CATALYST FROM IF0, IR0

CONTROL DEVICE FOR INTERNAL COMBUSTION ENGINE

CROSS-REFERENCE TO RELATED APPLICATION

This is a national phase application based on the PCT International Patent Application No. PCT/JP2012/074034 filed Sep. 20, 2012, the entire contents of which are incorporated herein by reference.

TECHNICAL FIELD

The present invention relates to an output correction device for an air-fuel ratio sensor. More specifically, the present invention relates to an output correction device that corrects outputs of air-fuel ratio sensors that are installed respectively in front and behind a catalyst in an exhaust path of an internal combustion engine.

BACKGROUND ART

For example, Patent Literature 1 discloses a failure detection device for an air-fuel ratio control device, which has air-fuel ratio sensors disposed respectively in front and behind a catalyst. The device determines a failure of the air-fuel ratio sensor installed upstream or a failure of a catalyst convertor, based on an output difference between the air-fuel ratio sensors in front and behind the catalyst. Further, in the device, an output from the air-fuel ratio sensor at a downstream side is corrected based on a reference output, and an output from the air-fuel ratio sensor at an upstream side is corrected by using the air-fuel ratio sensor at the downstream side.

CITATION LIST

Patent Literature
Patent Literature 1: Japanese Patent Laid-Open No. H06-280662
Patent Literature 2: Japanese Patent Laid-Open No. 2007-285288
Patent Literature 3: Japanese Patent Laid-Open No. 2011-117462
Patent Literature 4: Japanese Patent Laid-Open No. H09-287504

SUMMARY OF INVENTION

Technical Problem

When an error occurs to the characteristics of the air-fuel ratio sensors in front and behind a catalyst due to a manufacturing error, deterioration or the like of the air-fuel ratio sensors, an output error between the air-fuel ratio sensors influences control parameters of various kinds of control using the outputs from both the air-fuel ratio sensors in front and behind the catalyst. For example, in catalyst failure detection based on the outputs from the air-fuel ratio sensors in front and behind the catalyst, there is a fear of causing error determination in determination of normality and abnormality. Therefore, a system is desired, which can correct the deviation in the output characteristics between the air-fuel ratio sensors in front and behind the catalyst, or a deviation in the air-fuel ratios that is caused thereby.

In this regard, in the system of Patent Literature 1, a limiting current type air-fuel ratio sensor is installed in front of the catalyst, and an electromotive force type air-fuel ratio sensor is installed behind the catalyst. Here, it is difficult to correct a deviation in the characteristics between the electromotive force type air-fuel ratio sensor and the limiting current type air-fuel ratio sensor.

Accordingly, the present invention has an object to solve the above described problem, and provides a control device for an internal combustion engine that is improved to be able to correct a deviation between two air-fuel ratio sensors that are installed in front and behind a catalyst.

Solution to Problem

In order to attain the above described object, the invention is a control device for an internal combustion engine, and is applied to an internal combustion engine including a catalyst, a first air-fuel ratio sensor, and a second air-fuel ratio sensor. The catalyst is installed in an exhaust path and includes an oxygen storage capacity. The first air-fuel ratio sensor is a sensor installed upstream of the catalyst, and the second air-fuel ratio sensor is a sensor installed downstream of the catalyst. The control device for the internal combustion engine includes control means for controlling an air-fuel ratio of the internal combustion engine to a rich air-fuel ratio that is richer than a theoretical air-fuel ratio, or a lean air-fuel ratio that is leaner than the theoretical air-fuel ratio. Further, the control device for the internal combustion engine includes detection means and correction means. The detection means detects a first output that is an output of the first air-fuel ratio sensor, and a second output that is an output of the second air-fuel ratio sensor, in a state that is determined as reaching a state where the catalyst stores oxygen to an upper limit of an oxygen storage amount after the air-fuel ratio is switched to a lean air-fuel ratio from a rich air-fuel ratio, or a state where the catalyst releases oxygen to a lower limit of the oxygen storage amount after the air-fuel ratio is switched to a rich air-fuel ratio from a lean air-fuel ratio. The correction means corrects a relation (hereinafter, also called "a first relation") of an output of the first air-fuel ratio sensor, and a value of an air-fuel ratio that is calculated in accordance with the output of the first air-fuel ratio sensor, based on a difference between the first output and the second output. The correction includes, for example, the case of correcting the value corresponding to a detected output signal of the first air-fuel ratio sensor, and obtaining the value of the air-fuel ratio from the correction value, the case of correcting the relationship of the output value of the first air-fuel ratio sensor and the value of the air-fuel ratio corresponding thereto, which is set by a map, an arithmetic expression or the like, and obtaining the value of the air-fuel ratio from the output of the first air-fuel ratio sensor based on the corrected relationship, the case of correcting the value of the air-fuel ratio calculated from the output value of the first air-fuel ratio sensor, and the like.

In the present invention, the upper limit or the lower limit of the oxygen storage amount of the catalyst differs for a different catalyst, and is a value that changes in accordance with the temperature, the deterioration state and the like of the catalyst. Whether or not such a state arrives may be determined based on whether or not a reference time period elapses, after the air-fuel ratio is switched to a lean air-fuel ratio from a rich air-fuel ratio, or after the air-fuel ratio is switched to a rich air-fuel ratio from a lean air-fuel ratio, for example. Alternatively, whether or not this state arrives may be determined based on whether or not the output of the second air-fuel ratio sensor reaches an output corresponding to a lean air-fuel ratio after the air-fuel ratio is switched to the lean air-fuel ratio from a rich air-fuel ratio, or whether or not the output of the second air-fuel ratio sensor reaches an output corresponding to a rich output after the air-fuel ratio is switched to the rich air-fuel ratio from a lean air-fuel ratio.

In the present invention, the correction means may correct the first relation in a region where the air-fuel ratio is rich, in response to a difference between the first output and the second output which are detected in a state where the air-fuel ratio is controlled to the rich air-fuel ratio, and correct the first relation in a region where the air-fuel ratio is lean, in response to a difference between the first output and the second output which are detected in a state where the air-fuel ratio is controlled to the lean air-fuel ratio.

Further, in the present invention, the control device for an internal combustion engine may further include means for executing a fuel cut operation by stopping fuel supply to the internal combustion engine. In this case, the correction means may further correct the first relation, in response to a difference between a reference value of an output corresponding to atmosphere of an air-fuel ratio sensor, and a third output that is an output of the first air-fuel ratio sensor that is detected during the fuel cut operation. In this case, the correction means may further correct a relation (hereinafter, also called "a second relation") of the output of the second air-fuel ratio sensor, and a value of an air-fuel ratio that is calculated in accordance with the output of the second air-fuel ratio sensor, in response to the difference between the reference value and the third output. Similarly to the above, the correction includes, for example, the case of correcting the value corresponding to a detected output signal of the second air-fuel ratio sensor, and obtaining the value of the air-fuel ratio from the correction value, the case of correcting the relationship of the output value of the second air-fuel ratio sensor and the value of the air-fuel ratio corresponding thereto, which is set by a map, an arithmetic expression or the like, and obtaining the value of the air-fuel ratio from the output of the second air-fuel ratio sensor based on the corrected relationship, the case of correcting the value of the air-fuel ratio calculated from the output value of the second air-fuel ratio sensor, and the like. Note that "the reference value of the output" refers to a value to be a reference which is set in advance based on, for example, an output with respect to atmosphere of an output median value product of the air-fuel ratio sensor, a theoretical output of the air-fuel ratio sensor with respect to atmosphere which is calculated by arithmetic operation or the like.

Further, in the invention, the correction means may correct the first relation or the second relation in a region where the air-fuel ratio is lean, in response to the difference between the reference value and the third output, and correct the first relation or the second relation in a region where the air-fuel ratio is rich, from a correction coefficient that is set in advance in accordance with an output characteristic in a rich region with respect to an output characteristic in a lean region of an air-fuel ratio sensor, and the difference between the reference value and the third output.

Further, in the present invention, the correction means may correct the first relation, in response to a difference between a fourth output that is an output of the first air-fuel ratio sensor and a fifth output that is an output of the second air-fuel ratio sensor, that are detected in a state before the catalyst reaches a reference activation temperature, and the difference between the first output and the second output.

Advantageous Effects of Invention

When the state where oxygen stored in the catalyst is released to the lower limit of the oxygen storage amount arrives, or the state where oxygen is stored in the catalyst to the upper limit arrives, it is estimated that the exhaust gas air-fuel ratio downstream of the catalyst changes in response to a change of the exhaust gas air-fuel ratio upstream of the catalyst, and the air-fuel ratios of the exhaust gas become substantially the same upstream and downstream of the catalyst. In this state, the outputs (the first output and the second output) of the air-fuel ratio sensors upstream and downstream of the catalyst are substantially the same originally. However, when a variation arises in the output characteristics of the air-fuel ratio sensors, a difference arises between the first output and the second output. Accordingly, in the present invention, the relation of the output of the first air-fuel ratio sensor and the value of the air-fuel ratio corresponding thereto is corrected based on the difference between the first output and the second output, whereby the influence by the variation in the output characteristics which arises between the first air-fuel ratio sensor and the second air-fuel ratio sensor is eliminated, and the output characteristics of the air-fuel ratio sensors can be matched with each other upstream and downstream of the catalyst. Thereby, precision of the control using the outputs of both the air-fuel ratio sensors upstream and downstream of the catalyst can be improved.

Further, at the upstream side of the catalyst, the exhaust gas with a higher temperature flows as compared with at the downstream side of the catalyst. Therefore, deterioration of the first air-fuel ratio sensor which is disposed at the upstream side of the catalyst advances more easily than that of the second air-fuel ratio sensor at the downstream side. In this regard, according to the present invention, the output of the first air-fuel ratio sensor which is located at the upstream side of the catalyst can be made to correspond to the output of the second air-fuel ratio sensor at the downstream side, and therefore, detection of the air-fuel ratio can be performed with high precision.

Further, the outputs of the air-fuel ratio sensor differ in the region where the air-fuel ratio is rich and the region where the air-fuel ratio is lean. In this regard, in the present invention, in the case of making correction by dividing the region into the region where the air-fuel ratio is rich and the region where the air-fuel ratio is lean, correction of the relation between the output of the air-fuel ratio sensor and the value of the air-fuel ratio can be performed more accurately, in accordance with the output characteristics of the respective regions.

Further, the difference between the output (the third output) of the first air-fuel ratio sensor during the fuel cut operation and the reference value corresponds to the difference between the output with respect to the atmosphere, of the first air-fuel ratio sensor, and the reference output value with respect to atmosphere. Accordingly, the output of the air-fuel ratio sensor is corrected by adding the difference between the third output and the reference value thereto, whereby the deviation of the output of the first air-fuel ratio sensor with respect to the air-fuel ratio sensor to be the reference is corrected, and a more accurate air-fuel ratio can be detected.

Further, the output characteristics in the lean region of the respective air-fuel ratio sensors, and the output characteristics in the rich region have a specific correspondence, and the relation can be set as a correction coefficient in advance. Accordingly, by the difference between the third output during the fuel cut operation and the reference value described above and the coefficient, correction also can be performed more properly with respect to the output characteristics in the rich region. Thereby, the air-fuel ratios can be detected more accurately with respect to the lean region and the rich region.

BRIEF DESCRIPTION OF DRAWINGS

FIG. 3 is a diagram for explaining a circuit error of the air-fuel ratio sensor in the embodiment of the present invention.

FIG. 4 is a diagram for explaining correction of output characteristics of the air-fuel ratio sensor in the embodiment of the present invention.

DESCRIPTION OF EMBODIMENT

Hereinafter, an embodiment of the present invention will be described with reference to the drawings. Note that in the respective drawings, the same or the corresponding parts will be assigned with the same reference signs, and explanation thereof will be simplified or omitted.

Embodiment

Figure 1:
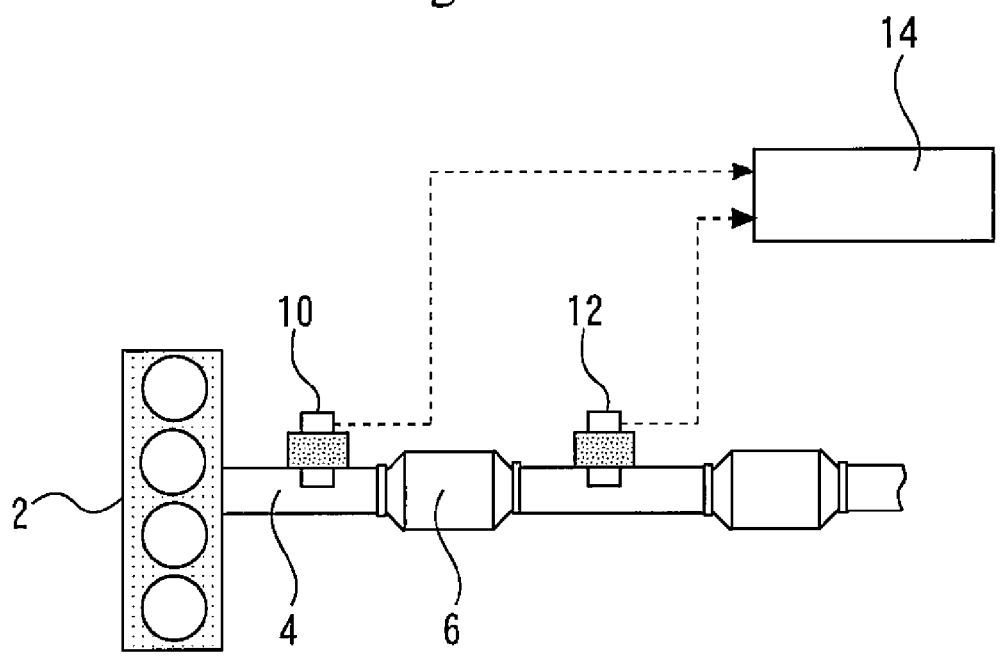
FIG. 1 is a schematic diagram for explaining an entire configuration of a system in an embodiment of the present invention.

FIG. 1 is a schematic diagram for explaining an entire configuration of a system in the embodiment of the present invention. The system in FIG. 1 is used by being mounted on a vehicle or the like. In FIG. 1, a catalyst 6 is installed in an exhaust path 4 of an internal combustion engine 2.

The catalyst 6 is a three-way catalyst. When the catalyst 6 is in a state functioning normally, the catalyst 6 efficiently purifies three components of HC, CO and NOx in an exhaust gas when an inflow exhaust gas air-fuel ratio is in a vicinity of a theoretical air-fuel ratio (hereinafter, also called "stoichiometry"). Further, the catalyst 6 has an oxygen storage capacity (Oxygen Storage Capacity; hereinafter, also called "OSC"), and adsorbs and stores oxygen in the exhaust gas to reduce a lean component such as a nitrogen oxide (NOx) when the exhaust gas air-fuel ratio is lean, whereas when the exhaust gas air-fuel ratio is rich, the catalyst releases oxygen and oxidizes rich components such as a carbon monoxide (CO) and hydrocarbon (HC) in the exhaust gas, whereby the catalyst purifies the exhaust gas.

An air-fuel ratio sensor 10 (a first air-fuel ratio sensor) is installed at an upstream side from the catalyst 6 in the exhaust path 4. An air-fuel ratio sensor 12 (a second air-fuel ratio sensor) is installed at a downstream side from the catalyst 6 in the exhaust path 4. Note that in the following embodiment, the air-fuel ratio sensor 10 at the upstream side of the catalyst 6 will be also called "the Fr sensor 10", and the air-fuel ratio sensor 12 at the downstream side will be also called "the Rr sensor 12", for convenience.

The system in FIG. 1 includes a control device 14. The control device 14 generally controls the entire system of the internal combustion engine 2. Various actuators are connected to an output side of the control device 14, and various sensors such as the air-fuel ratio sensors 10 and 12 are connected to an input side. The control device 14 receives sensor signals and detects the air-fuel ratio of an exhaust gas, an engine speed, and various other kinds of information necessary for an operation of the internal combustion engine 2, and operates the respective actuators in accordance with a control program stored in an ROM contained therein. Further, the control device 14 contains a backup RAM that is storage means that retains data even when a power supply is turned off, and can rewrite data, and stores correction values and the like necessary for respective controls. Note that there are numbers of actuators and sensors which are connected to the control device 14, but explanation thereof will be omitted in the present description.

[Function of Air-Fuel Ratio Sensors]

The air-fuel ratio sensors 10 and 12 are both single cell type limiting current type air-fuel ratio sensors. Each of the air-fuel ratio sensors 10 and 12 has a pair of electrodes that are an exhaust pole and an atmosphere pole, and a solid electrolyte film sandwiched between the electrodes. When a predetermined voltage is applied to the air-fuel ratio sensors 10 and 12, oxygen ions ($O^{2-}$) migrate in the solid electrolyte film in response to an oxygen concentration of an exhaust gas to be a detection target.

More specifically, when the air-fuel ratio of the exhaust gas to be the detection target of the air-fuel ratio sensors 10 and 12 is a lean air-fuel ratio, oxygen at the exhaust pole sides which passes a diffusion layer is ionized by application of a voltage to the air-fuel ratio sensors 10 and 12. $O^{2-}$ migrates in the solid electrolyte film toward the atmosphere pole sides from the exhaust poles. A positive limiting current corresponding to an amount of $O^{2-}$ that migrates to the atmosphere pole from the exhaust pole flows to the air-fuel ratio sensors 10 and 12.

Meanwhile, when the exhaust gas air-fuel ratio is a rich air-fuel ratio, rich components such as HC and CO, and $H_2$ that exist in the exhaust gas pass through the diffusion layer to reach the exhaust poles by application of a voltage to the air-fuel ratio sensors 10 and 12. Meanwhile, at the atmosphere pole sides, oxygen is ionized. $O^{2-}$ migrates in the solid electrolyte film toward the exhaust pole sides from the atmosphere poles, and reacts with HC, CO, and $H^2$ at the exhaust poles. By the reaction, a negative limiting current corresponding to an amount of $O^{2-}$ which migrates to the exhaust poles from the atmosphere poles flows in the air-fuel ratio sensors 10 and 12.

Figure 2:
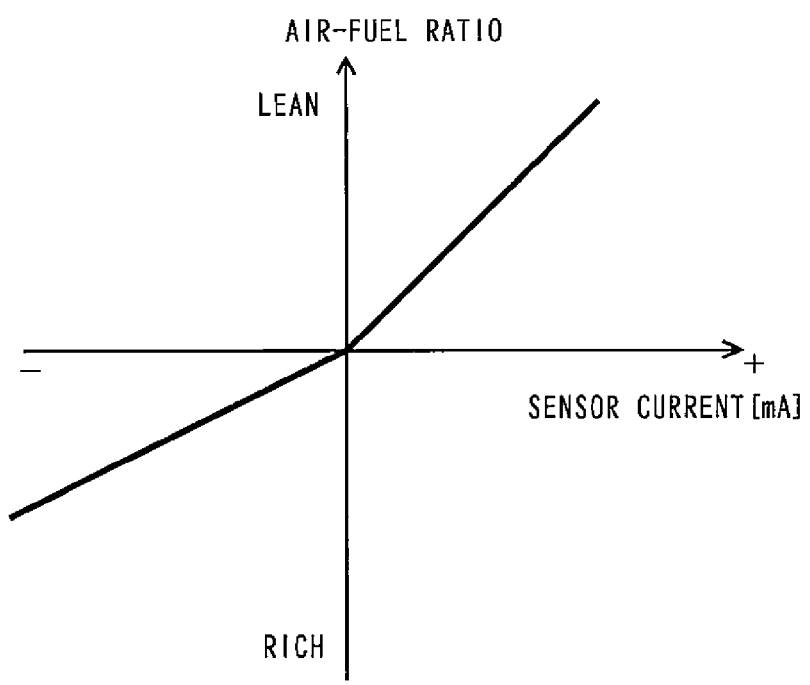
FIG. 2 is a diagram for explaining a relation of an output of the air-fuel ratio sensor and an air-fuel ratio in the embodiment of the present invention.

The air-fuel ratio sensors 10 and 12 output the limiting current which flows by migration of $O^{2-}$ as sensor outputs (sensor currents). FIG. 2 is a diagram explaining a relation of the sensor current as the output of the air-fuel ratio sensor and an air-fuel ratio in the embodiment of the present invention. In FIG. 2, an axis of abscissa represents the sensor current, and an axis of ordinates represents the air-fuel ratio. Further, FIG. 2 shows an accurate relation without including an error of the sensor current and the air-fuel ratio, of an air-fuel ratio sensor of the same type as the air-fuel ratio sensors 10 and 12.

As described above, the sensor current becomes a sensor current corresponding to the migration amount of $O^{2-}$ corresponding to the oxygen concentration in the exhaust gas. Accordingly, the sensor current and the air-fuel ratio of the exhaust gas to be the detection target includes a correlation.

More specifically, the sensor current and the air-fuel ratio have a relation in which the sensor current and the air-fuel ratio increase proportionally to each other as shown in FIG. 2.

Further, when the air-fuel ratio is lean, and when the air fuel ratio is rich, phenomena which occur at the time of detection of the sensor currents differ as described above. Therefore, a relation (a gradient) of the sensor current and the air-fuel ratio differs at a lean side and a rich side of the air-fuel ratio as shown in FIG. 2.

The relation of the sensor current and the air-fuel ratio as shown in FIG. 2 can be obtained, for example, theoretically, or in accordance with an average value of outputs at an initial stage of the air-fuel ratio sensor of the same type, or an output of an output median value product that shows an average output among the same type of air-fuel ratio sensors. Note that in the present embodiment, the relation of the sensor current value of the average air-fuel ratio sensor or the sensor current value obtained theoretically, and the value of the air-fuel ratios corresponding thereto is determined in advance as a map or the like, and is stored in the control device 14 as shown in FIG. 2. Further, the values of the sensor currents corresponding to the air-fuel ratios, which are set in the map, will be called "true values" for convenience hereinafter.

[Calculation of Correction Values to Outputs from Fr Sensor 10 and Rr Sensor 12]

Controls that are executed by the control device 14 in the system include a control of correcting outputs of the air-fuel ratio sensors 10 and 12. Namely, the control device 14 stores a control program in which the control of correcting the sensor outputs of the air-fuel ratio sensors 10 and 12 is programmed to be executed. Note that in the present embodiment, correction of the outputs of the air-fuel ratio sensors 10 and 12 is performed based on the sensor currents.

In the present embodiment, the following three kinds of output correction values are calculated for the outputs of the air-fuel ratio sensors 10 and 12.
(1) Correction value of a circuit error
(2) Correction value that matches the output characteristics of the air-fuel ratio sensors 10 and 12 to each other
(3) Correction values of the output characteristics of the air-fuel ratio sensors 10 and 12, with respect to true values
(1) Correction Value of a Circuit Error FIG. 3 is a diagram for explaining a relation of the sensor current and the air-fuel ratio in the present embodiment. In FIG. 3, an axis of abscissa represents the air-fuel ratio, and an axis of ordinates represents a sensor current. Further, in FIG. 3, a broken line (a) represents a relation of the true value and the air-fuel ratio, and a solid line (b) represents a relation of the sensor current and the air-fuel ratio when only a circuit error occurs to an air-fuel ratio sensor.

As described above, the map which sets the relation of the true values of the sensor currents of the air-fuel ratio sensors 10 and 12, and the air-fuel ratio is stored in the control device 14 in advance. However, a circuit for processing the outputs from the air-fuel ratio sensor which is used when the map or the like is set, and a circuit for detecting the outputs of the air-fuel ratio sensors 10 and 12 which are used when the air-fuel ratio sensors 10 and 12 are actually mounted in a vehicle differ from each other. Further, when the air-fuel ratio sensors 10 and 12 are continuously used, a deviation occurs to resistances or the like of the circuit for sensor current detection due to aged deterioration thereof. By the difference in the circuits like this, an error (a circuit error) sometimes occurs to the relation of the sensor currents and the air-fuel ratios. The circuit error is uniformly included in the sensor current as shown in FIG. 3.

Here, when the air-fuel ratio sensors 10 and 12 are in an inactive state, or when the exhaust gas air-fuel ratio is stoichiometry, the air-fuel ratio sensors 10 and 12 do not generate internal currents, and the sensor currents are zero. Accordingly, the sensor current values which are detected when the air-fuel ratio sensors 10 and 12 are in an inactive state directly correspond to circuit errors. Accordingly, the correction values to the respective circuit errors of the Fr sensor 10 and the Rr sensor 12 are inverse numbers of output values IFstg and IRstg at the time of the air-fuel ratio sensors 10 and 12 being in the inactive state. Namely, correction is performed so that the output values IFstg and IRstg at the inactive time are subtracted from the air-fuel ratio sensors 10 and 12.

However, for convenience, in the present embodiment, it is assumed that the control device 14 detects the sensor currents from which the circuit errors IFstg and IRstg are subtracted in advance as the output of the Fr sensor 10 and the output of the Rr sensor 12. Namely, in the correction as follows, an Fr output IF that is the output (the sensor current) of the Fr sensor 10 is a value from which a circuit error IFstg is subtracted. Further, an Rr output IR that is the output (the sensor current) of the Rr sensor 12 is a value from which a circuit error amount IRstg is subtracted. Namely, the Fr output IF and the Rr output IR are both values corrected to the output values without including the circuit errors. Accordingly, values of IFstg and IRstg that are newly detected for correction of the circuit errors are added to IFstg and IRstg which are stored in advance, and are stored in the backup RAM as correction values IFstg and IRstg for the circuit errors.

(2) Correction Values that Match Output Characteristics of Air-Fuel Ratio Sensors 10 and 12 to Each Other FIG. 4 is a diagram for explaining the output characteristics of the Fr sensor 10 and the Rr sensor 12 in the present embodiment. In FIG. 4, an axis of abscissa represents the air-fuel ratio, and an axis of ordinates represents the sensor current. Further, in FIG. 4, a broken line (a) represents the output characteristic of the Rr sensor 12, and a solid line (b) represents the output characteristic of the Fr sensor 10.

When a variation occurs to the output characteristics/characteristic of the Fr sensor 10 and/or the Rr sensor 12, a deviation sometimes occurs between the Fr sensor 10 and the Rr sensor 12, as shown in FIG. 4. The deviation like this is desired to be eliminated because the deviation can have an influence on control parameters in controls based on both the air-fuel ratios upstream and downstream of the catalyst 6. Accordingly, after correction of the circuit error, the system of the present embodiment performs correction for matching the output characteristics of the Fr sensor 10 and the Rr sensor 12 to each other.

The present embodiment adopts a manner of making correction so as to match the output characteristic (the line (b)) of the Fr sensor 10 to the output characteristic (the line (a)) of the Rr sensor 12 as shown in FIG. 4. This is because the Fr sensor 10 is disposed under the environment exposed to a high-temperature exhaust gas and therefore, deterioration advances to cause a deviation in the output, whereas the detection target of the Rr sensor 12 is a low-temperature exhaust gas purified by the catalyst 6 and therefore, deterioration hardly advances.

Figure 5:
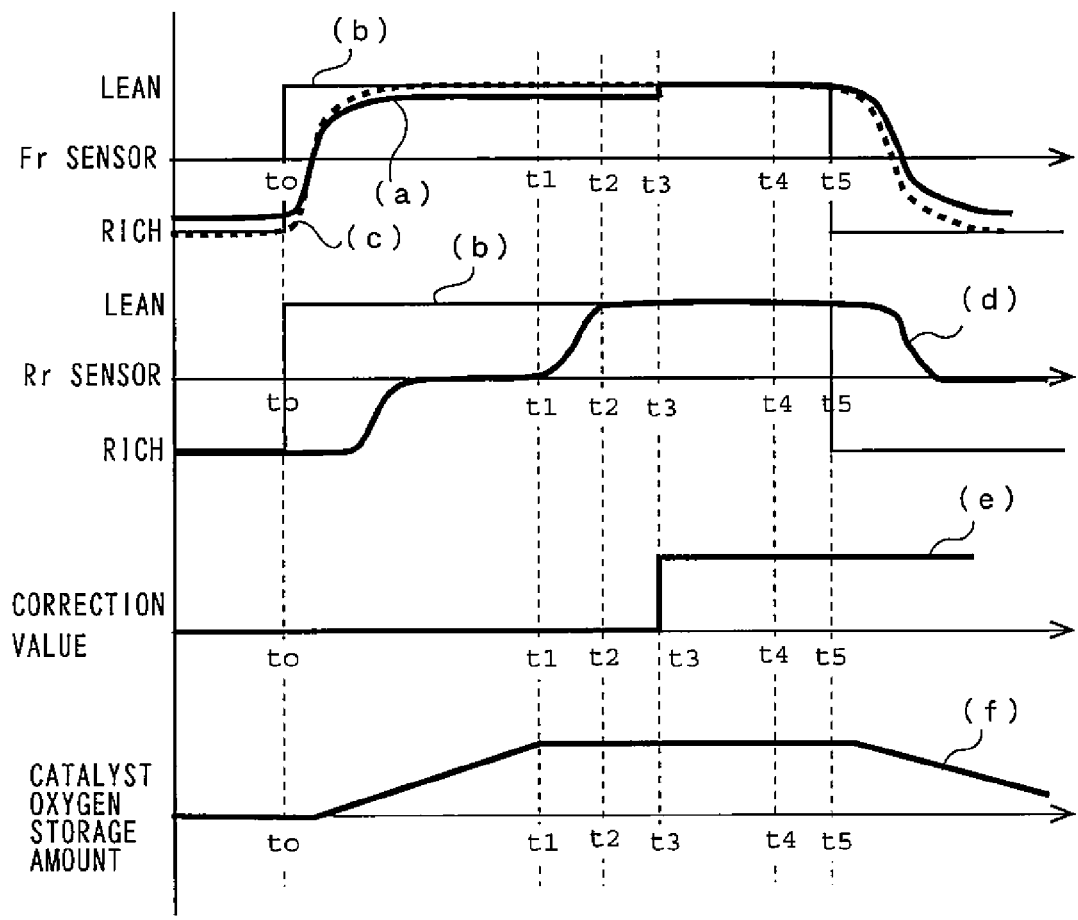
FIG. 5 is a timing chart for explaining control of calculating a correction value that matches the output characteristics in the embodiment of the present invention.

With use of FIG. 5, a correction method for matching the output characteristics of the Fr sensor 10 and the Rr sensor to each other will be described. FIG. 5 is a timing chart for explaining control of calculating the correction value that matches the output characteristics to each other in the embodiment of the present invention. In FIG. 5, an axis of abscissa represents a time. Further, a solid line (a) represents an air-fuel ratio based on the output of the Fr sensor 10, a solid line (b) represents a target air-fuel ratio, a broken line (c) represents a change in an actual exhaust gas air-fuel ratio upstream of the catalyst, a solid line (d) represents an air-fuel ratio based on the output of the Rr sensor 12, a solid line (e) represents a correction value for matching the output characteristics to each other, and a solid line (f) represents a change in an oxygen storage amount of the catalyst 6, respectively.

The correction value for correction that matches the output characteristics of the air-fuel ratio sensors 10 and 12 to each other is calculated separately for a region (a rich region) where the air-fuel ratio is richer than stoichiometry, and a region (a lean region) where the air-fuel ratio is lean. More specifically, a target air-fuel ratio at a lean side (a lean target air-fuel ratio) is set as A/F=15, and a target air-fuel ratio at a rich side (a rich target air-fuel ratio) is set as A/F=14.

On an occasion of calculation of the correction value, an active control of switching the target air-fuel ratio to a rich or lean target air-fuel ratio every fixed time period is executed, as shown by the solid line (b) in FIG. 5. When the air-fuel ratio is switched to the lean air-fuel ratio from the rich air-fuel ratio at a time point t0, for example, during the active control, the exhaust gas air-fuel ratio upstream of the catalyst 6 changes to the lean air-fuel ratio with this (the broken line (c)).

When the exhaust gas air-fuel ratio changes to the lean air-fuel ratio upstream of the catalyst 6, the catalyst 6 which is in a state where the catalyst 6 releases stored oxygen to a lower limit of the oxygen storage amount stores oxygen in a lean exhaust gas which flows therein. Thereby, the exhaust gas is reduced by the catalyst 6. While the catalyst 6 stores oxygen, and reduces and purifies the lean exhaust gas like this (a time period from the time point 0 to a time point t1), an exhaust gas in the vicinity of stoichiometry is discharged downstream of the catalyst 6. Accordingly, during this period, the air-fuel ratio based on the output of the Rr sensor 12 becomes a value in the vicinity of stoichiometry (the solid line (d)).

Thereafter, when the catalyst 6 stores oxygen up to a saturation state (an upper limit) and the OSC reaches the saturation state at the time point t1, as shown by the solid line (f), the exhaust gas air-fuel ratio is brought into a state in which the exhaust gas air-fuel ratio does not change any more by the oxygen storage of the catalyst 6. Accordingly, at a time point t2 after a lapse of a response delay time or the like of the Rr sensor 12 thereafter and a delay time corresponding to a capacity, the air-fuel ratio based on the output of the Rr sensor 12 substantially matches with the target air-fuel ratio, and is stabilized (the solid line (d)).

Here, the target air-fuel ratio is controlled to a constant lean target air-fuel ratio, and therefore, when the air-fuel ratio based on the output from the Rr sensor 12 substantially matches with the target air-fuel ratio and is stabilized, the air-fuel ratio of the exhaust gas upstream of the catalyst 6 and the downstream exhaust air-fuel ratio are in a state substantially matched with each other. Accordingly, in the present embodiment, at a time point t3 after reaching this state, the Fr output IF (the first output) and the Rr output IR (the second output) are detected. Subsequently, from a ratio of both the outputs, the correction value for the lean region to the output from the Fr sensor 10 is calculated. The output of the Fr sensor 10 is corrected in response to the correction value, whereby a difference that occurs between the air-fuel ratio (the solid line (a)) based on the output of the Fr sensor 10 and the actual exhaust gas air-fuel ratio (the broken line (c)) is corrected, and based on the output of the Fr sensor 10, the air-fuel ratio is calculated accurately.

Though not illustrated, calculation of the correction value for the rich region is similarly performed. Namely, when the air-fuel ratio is switched to the rich air-fuel ratio in the state in which the catalyst 6 stores oxygen up to the upper limit, and the catalyst 6 releases oxygen to the lower limit of the oxygen storage amount (OSC is in a saturation state), the exhaust gas air-fuel ratio is brought into a state in which the exhaust gas air-fuel ratio does not change any more in the catalyst 6. When the exhaust gas air-fuel ratio reaches this state, the exhaust gas air-fuel ratios are stabilized in a state in which the exhaust gas air-fuel ratios substantially match with each other upstream and downstream of the catalyst 6. Accordingly, after the exhaust gas air-fuel ratios reach this state, the Fr output IF and the Rr output IR are detected, and from a ratio of both the outputs, the correction value to the output of the Fr sensor in the rich region is calculated.

In the specific control of the present embodiment, detection timings of the Fr output IF and the Rr output IR for calculating the correction values for the lean and rich regions are set as a time point when an elapsed time from a time point when the target air-fuel ratio is switched to a rich or lean air-fuel ratio exceeds a reference time period. The reference time period is set at a time period which is longer than a time period (namely, an oxygen storage time period) until the catalyst 6 stores oxygen up to the upper limit after the target air-fuel ratio is switched to the lean air-fuel ratio in the state in which the storage oxygen of the catalyst 6 is released to the lower limit, or until the catalyst 6 releases oxygen to the lower limit after the target air-fuel ratio is switched to the rich air-fuel ratio in the state in which the catalyst 6 stores oxygen up to the upper limit. In other words, the reference time period is set at a time period which is longer than a time period until a change in the exhaust gas air-fuel ratio by an action of oxygen storage or release of the catalyst 6 does not occur after the target air-fuel ratio is switched to the rich or lean air-fuel ratio. Alternatively, the reference time period is properly set at a time period which is longer than a time period until the exhaust gas air-fuel ratio downstream of the catalyst 6 reaches a predetermined state in which the exhaust gas air-fuel ratio downstream of the catalyst 6 changes in response to the exhaust gas air-fuel ratio upstream of the catalyst 6, after the target air-fuel ratio is switched to a rich or lean air-fuel ratio. Note that the oxygen storage amount of the catalyst 6 differs for a different catalyst 6, and therefore, the specific value of the actual reference time period can be properly set in accordance with the catalyst 6 in advance, and stored in the control device 14. Alternatively, the oxygen storage amount of the catalyst 6 differs in accordance with the deterioration state, the temperature and the like of the catalyst 6. Accordingly, for example, when the oxygen storage time period is detected by control of the deterioration determination or the like of the catalyst 6, the reference time period may be controlled to be set/updated in accordance with the time period.

Further, under the environment where the exhaust gas air-fuel ratios after a lapse of the reference time period match with each other, the Fr output IF and the Rr output IR are detected N times (for example, N=10) which is reference number of times, and an average value thereof is used in calculation of the correction value.

For example, from an average value IFR of the Fr output IF and an average value IRR of the Rr output IR in the rich region, a correction value K1R (a first correction value) for the Fr output IF in the rich region is calculated by expression (1) as follows.

$$K1R = IRR/IFR \quad (1)$$

Similarly, an output average value IFL of the Fr output IF and an output average value IRL of the Rr sensor 12 in the lean region are respectively obtained, and a correction value K1L (a first correction value) for the output at the lean side of the Fr sensor 10 is calculated by expression (2) as follows.

$$K1L=IRL/IFL \qquad (2)$$

The correction value K1R and the correction value K1L are stored in the backup RAM as the correction values (the first correction values) for the output of the Fr sensor 10 in the respective lean region and rich region.

Note that in order to calculate the correction value more accurately, detection of the Fr output IF and Rr output IR for calculation of the correction value is executed under the following preconditions.
(Precondition 1)
After the internal combustion engine 2 is warmed up. More specifically, a water temperature (or an oil temperature) of the internal combustion engine 2 is equal to or higher than a reference temperature (for example, 70° C.).
(Precondition 2)
After the catalyst 6 is warmed up. More specifically, the catalyst 6 has a temperature equal to or higher than a reference temperature (for example, 600° C.). However, determination of whether or not the catalyst 6 is warmed up is not limited to determination by directly detecting the temperature of the catalyst 6. For example, it may be determined that the catalyst 6 is warmed up based on that the integral value of the intake air amount after start of the internal combustion engine 2 becomes larger than a reference value.
(Precondition 3)
The internal combustion engine 2 is not under acceleration or deceleration. During acceleration and deceleration, the air-fuel ratio of the exhaust gas is not stabilized, and the environment where the exhaust gas has the same air-fuel ratio in front and behind the catalyst 6 is difficult to create. Namely, during acceleration and deceleration of the internal combustion engine 2, the environment suitable for correction of matching the output characteristics of the Fr sensor 10 and the Rr sensor 12 to each other is difficult to make, and therefore, calculation of the correction value during acceleration and deceleration of the internal combustion engine 2 is avoided. Whether or not the condition is satisfied can be determined based on whether or not a change amount per unit time of a throttle opening degree is smaller than a reference value, for example.
(Precondition 4)
The Fr sensor 10 and the Rr sensor 12 are in an active state and have not failed. More specifically, it is determined whether or not the Fr sensor 10 and the Rr sensor 12 are in the active state based on whether or not respective impedances of the Fr sensor 10 and the Rr sensor 12 are equal to or smaller than a reference value. Further, it is determined whether or not the Fr sensor 10 and the Rr sensor 12 have failed based on the result of control or the like of determination of failures of the air-fuel ratio sensors 10 and 12, which is executed in accordance with another control program.
(Precondition 5)
The internal combustion engine is not under a fuel cut (F/C) operation. This is for calculating the correction value from the output values of the air-fuel ratio sensors when the target air-fuel ratio is set at a rich and a lean target air-fuel ratios in the vicinities of stoichiometry.
(3) Correction Value with Respect to True Value
Furthermore, in the present embodiment, correction with an atmosphere output set as a reference is performed. By the correction, an error from a median value product (a true value) is corrected, and a difference between the air-fuel ratio calculated based on the sensor output and the actual air-fuel ratio is eliminated. The correction is carried out in a state where the above described preconditions 1 to 4 are established, and at a timing during a fuel cut operation.

More specifically, after a predetermined time period (for example, approximately three seconds) elapses after the operation is switched to the fuel cut operation, the Fr output IF is detected during the fuel cut operation. Here, the Fr output IF is detected N times, which is the reference number of times, and the output average value IFA thereof is obtained.

A deviation with respect to a true value IA of the average value is set as a correction value K2L (a second correction coefficient) at the lean side, and is calculated according to expression (3) as follows.

$$K2L=IA/(IFA\times K1L) \qquad (3)$$

Namely, K2L which is calculated here is a ratio of the true value, to the output after correction of the Fr sensor 10. Further, as K1L, a value of K1L which is stored in the backup RAM at the stage of the correction is used.

Next, a correction value with respect to a true value at the rich side is calculated from the above correction value. As described above, due to a difference in reaction at the rich side and the lean side, the air-fuel ratio sensors indicate different output characteristics in the rich region and the lean region. More specifically, a correlation of the sensor output and the air-fuel ratio differs in the rich region and the lean region, and a gradient of the air-fuel ratio/sensor current becomes different with the stoichiometric point as a boundary.

The gradients of the air-fuel ratio/sensor current with respect to the true values in the respective rich region and lean region are obtained in advance. In the present embodiment, as a correction coefficient k that is set in accordance with the output characteristic in the rich region with respect to the output characteristic in the lean region of the air-fuel ratio sensor, a value of a ratio of the gradient at the rich side and the gradient at the lean side (the gradient in the rich region/the gradient in the lean region) which is calculated in advance is set in advance, and is stored in the control device 14. By using the correction coefficient k, a correction value K2R (a third correction coefficient) at the rich side can be calculated from the lean side correction value K2L to the true value. More specifically, the correction value K2R at the rich side is calculated by expression (4) as follows.

$$K2R=k\times K2L \qquad (4)$$

The correction value with respect to the true value is updated every time the correction value is calculated, and is stored in the backup RAM.

Further, from the correction values with which correction for matching the output characteristics of the Fr sensor 10 and the Rr sensor 12 with each other as described above, the correction values K2L and K2R with respect to the true value are calculated. Accordingly, the correction values are directly used as the correction values for the output Rr of the Rr sensor 12. Note that the reason why the output of the Fr sensor 10 is used in the correction with respect to the true value is that if a delay time (a predetermined time period) corresponding to the capacity to the installation position of the Fr sensor 10 from the internal combustion engine 2 is waited for, the output for calculation of the correction value can be detected without waiting for saturation of the OSC of the catalyst 6. Namely, by using the output of the Fr sensor 10, a learning frequency of the correction values K2L and K2R can be increased.

[Calculation of Correction Outputs of Fr Sensor 10 and Rr Sensor 12]

By the above correction, when the air-fuel ratio is lean, a correction output IF0 of the Fr sensor 10 is corrected as in expression (5) as follows.

$$IF0=IF \times K1L \times K2L (IF>0) \quad (5)$$

Note that K2L is calculated by IA/(IFA×K1L) as in expression (3) described above, but the correction value K1L is the value which is updated every time the correction value is calculated, and therefore, the values of K1L in expression (3) and expression (5) are not the same. Accordingly, IF0=IF× IA/IFA is not established.

Further, when the air-fuel ratio is rich, a correction output IF0 of the Fr sensor 10 is corrected as in expression (6) as follows.

$$IF0=IF \times K1R \times K2R (IF \leq 0) \quad (6)$$

Furthermore, a correction output IR0 of the Rr sensor 12 in the case of the air-fuel ratio being lean is corrected as in expression (7) as follows.

$$IR0=IR \times K2L (IR>0) \quad (7)$$

The output IR0 of the Rr sensor 12 in the case of the air-fuel ratio being rich is corrected as in expression (8) as follows.

$$IR0=IR \times K2R (IR \leq 0) \quad (8)$$

[Routine of Specific Control in Present Embodiment]

FIG. 6 to FIG. 9 are flowcharts for explaining routines of the control executed by the control device 14 in the embodiment of the present invention. The routines in FIG. 6 to FIG. 9 are routines which are repeatedly executed at constant arithmetic operation periods.

Figure 6:
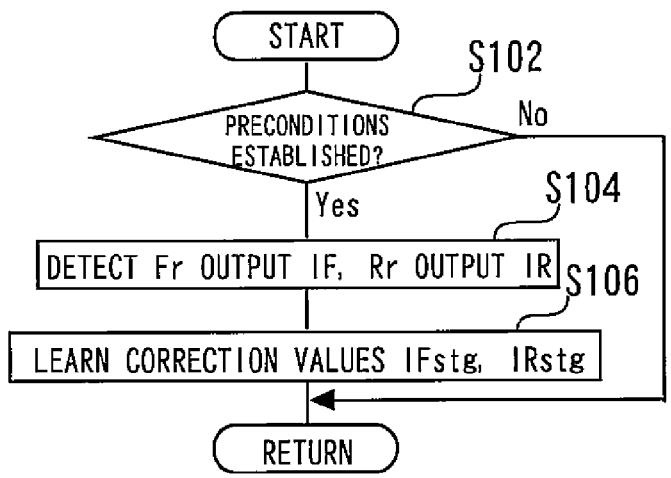
FIG. 6 is a flowchart for explaining a routine of control executed by a control device in the embodiment of the present invention.
Figure 7:
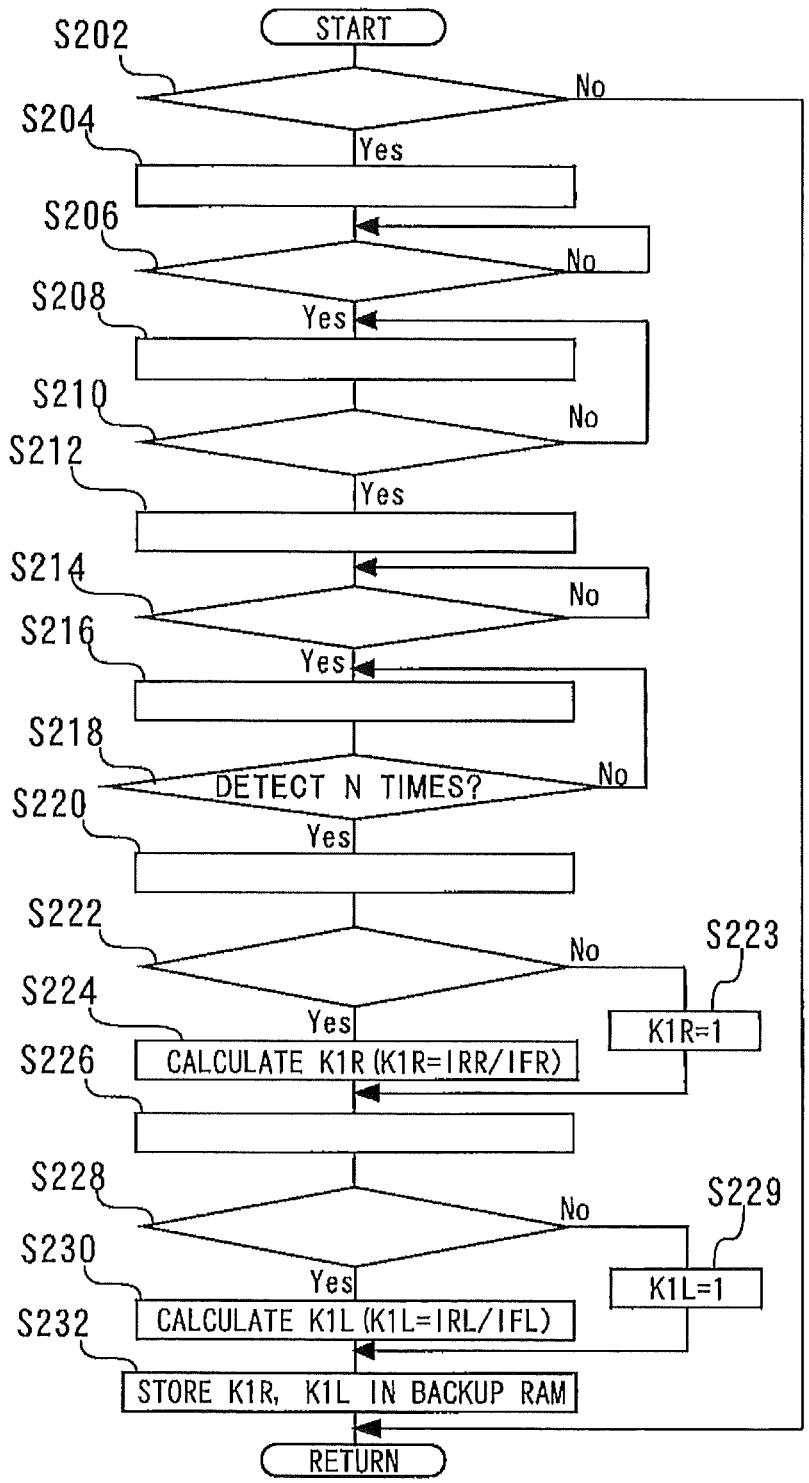
FIGS. 7A and 7B comprise a flowchart for explaining a routine of control executed by the control device in the embodiment of the present invention.

First, according to a routine in FIG. 6, the correction value of the circuit error is calculated. More specifically, it is firstly determined whether or not the preconditions are established (S102). The preconditions are the conditions which are stored in the control device 14 in advance, and more specifically are, for example, whether it is within a predetermined time period after the internal combustion engine 2 is started, whether the water temperature (or the oil temperature) is lower than the predetermined temperature, whether the element temperatures of the Fr sensor 10 and the Rr sensor 12 are both lower than the predetermined temperature (namely, for example, the impedances of the Fr sensor 10 and the Rr sensor 12 are larger than the predetermined value) and the like. When establishment of the preconditions is not recognized in step S102, processing of this time is temporarily ended.

Meanwhile, when establishment of the preconditions is recognized in step S102, the Fr output IF and the Rr output IR are respectively detected next (S104). Next, the Fr output IF and the Rr output IR are respectively added to IFstg and IRstg which are stored in the backup RAM at present, and the added values are stored in the backup RAM as the correction values IFstg and IRstg.

In a routine in FIGS. 7A and 7B, it is determined whether or not the preconditions are established (S202). The preconditions are the conditions stored in the control device 14. As the specific preconditions, the above described (precondition 1) to (precondition 5) are cited, for example. When the preconditions are not recognized, the processing of this time is temporarily ended.

Meanwhile, when establishment of the preconditions is recognized, the target air-fuel ratio is set at a rich target air-fuel ratio, and the control is switched to the air-fuel ratio feedback control based on the output of the Fr sensor 10 (S204). The specific value of the rich target air-fuel ratio is stored in the control device 14. By the processing in step 204 described above, F/B control based on the outputs of the Fr sensor 10 and the Rr sensor 12 with stoichiometry as the target air-fuel ratio is stopped, and the control is switched to the F/B control based on the output of the Fr sensor 10 with the rich target air-fuel ratio as the target air-fuel ratio. In the F/B control, the output from the Rr sensor 12 is not used.

Next, it is determined whether or not the elapsed time after the control is switched to the control of the rich target air-fuel ratio reaches the reference time period (S206). The reference time period in this case is the time period which is set in accordance with the OSC of the catalyst 6 as described above, and the set value is stored in the backup RAM or the like. When a lapse of the reference time period is not recognized, the determination processing of step S206 is repeated until the lapse of the reference time period is recognized.

Meanwhile, when the lapse of the reference time period is recognized in step S206, the Fr output IF and the Rr output IR are detected next (S208). Next, it is determined whether or not the outputs of the Fr sensor 10 and the Rr sensor 12 are respectively detected N times (S210). When the number of detection times is not equal to or larger than the N times, the flow is returned to S208 again, and detection of the Fr output IF and the Rr output IR, and the determination processing in step S210 are repeated until the number of detection times reaches the N times.

Meanwhile, when the N times of detection is recognized in step S210, the target air-fuel ratio is set at the lean target air-fuel ratio next, and the control is switched to the air-fuel ratio feedback control based on the Fr output IF (S212). The specific value of the lean target air-fuel ratio is stored in the control device 14. In the F/B control, the output of the Rr sensor 12 is not used.

Next, it is determined whether or not an elapsed time after the control is switched to the control of the lean target air-fuel ratio reaches a reference time period (S214). The reference time period in this case refers to the time period corresponding to the OSC of the catalyst 6 as described above, and is properly set and stored in the backup RAM or the like. When the lapse of the reference time period is not recognized, the determination processing of step S214 is repeated until the lapse of the reference time period is recognized.

Meanwhile, when the lapse of the reference time period is recognized in step S214, the Fr output IF and the Rr output IR are detected next (S216). Next, it is determined whether or not the Fr output IF and the Rr output IR are respectively detected N times (S218). When the number of detection times is not equal to or larger than the N times, the flow is returned to S218 again, and detection of the outputs of the Fr sensor 10 and the Rr sensor 12 in step S216, and the determination processing in step S218 are repeated until the number of detection times exceeds the N times.

Meanwhile, when N times of detection is recognized, the respective output average values IFR and IRR of the Fr outputs IF and the Rr outputs IR which are acquired N times under the rich region are calculated by the processing of step S208 next (S220).

Next, it is determined whether or not an absolute value |IFR−IRR| of the difference between the output average values IFR and IRR is larger than a reference value (S222). Here, the reference value is the value which is stored in the control device 14 in advance, and is set at a lower limit value of a range where the output deviation is considered to occur between the Fr sensor 10 and the Rr sensor 12 in the region at the rich side, for example. Accordingly, when establishment of |IFR−IRR|>the reference value is not recognized in step S222, the correction value K1R at the rich region side is set at an initial value 1 (S223).

Meanwhile, when establishment of |IFR−IRR|>the reference value is recognized in step S222, the correction value K1R at the rich side with respect to the Fr sensor 10 is calculated next (S224). The correction value K1R at the rich side is calculated in accordance with expression (1) as described above in accordance with the output average values IRR and IFR which are calculated in step S220.

When the correction value K1R at the rich side is calculated in step S224, or when the correction value K1R=1 is set in step S223, the output average values IFL and IRL of the respective Fr outputs IF and the Rr outputs IR which are detected N times under the lean region by the processing of step S216 are calculated next (S226).

Next, it is determined whether or not the absolute value |IFL−IRL| of the difference between the output average values IFL and IRL is larger than the reference value (S228). Here, the reference value is the value which is stored in the control device 14 in advance, and is set at a lower limit value in the range where an output deviation is recognized as occurring between the Fr sensor 10 and the Rr sensor 12 in the lean region. Accordingly, when establishment of |IFL−IRL|>reference value is not recognized in step S228, the correction value K1L at the lean side is set at an initial value 1 (S229).

Meanwhile, when establishment of |IFL−IRL|>reference value is recognized in step S228, the correction value K1L at the lean side with respect to the Fr sensor 10 is calculated next (S230). The correction value K1L at the lean side is calculated in accordance with expression (2) described above in accordance with the output average values IRL and IFL which are calculated in step S226.

By the above processing, K1R which is obtained in step S223 or S224, and K1L which is obtained in step S229 or S230 are stored in the backup RAM (S232), and the processing of this time is ended.

Figure 8:
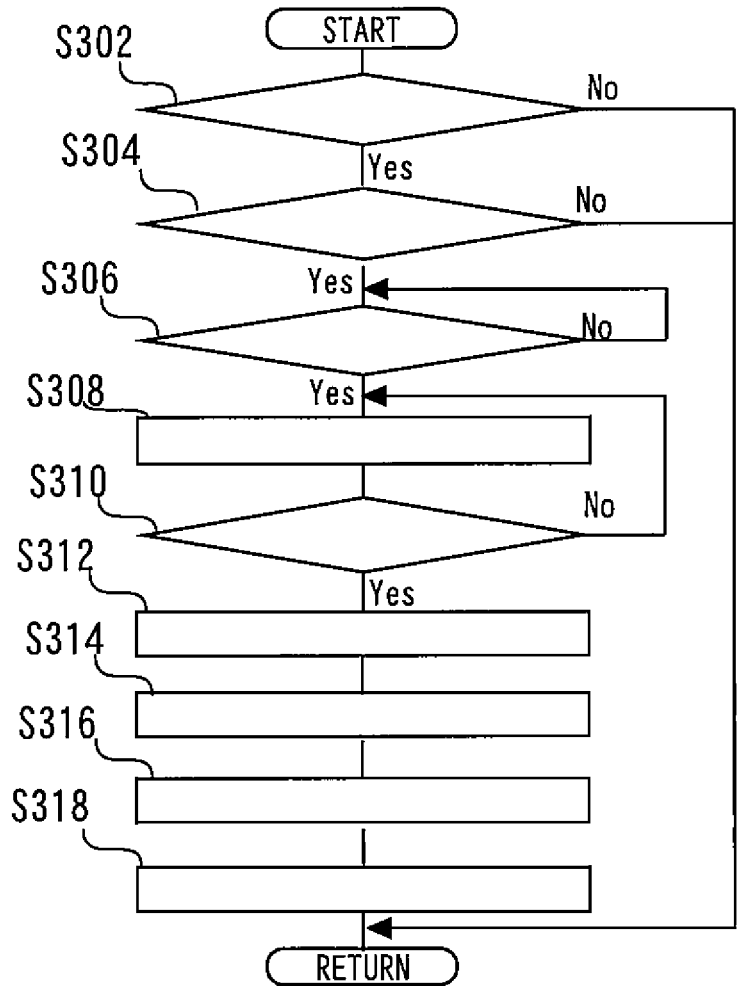
FIG. 8 is a flowchart for explaining a routine of control executed by the control device in the embodiment of the present invention.

In the routine in FIG. 8, it is determined whether or not the preconditions are established first (S302). The preconditions are stored in the control device 14 in advance. More specifically, for example, (precondition 1) to (precondition 4) described above and the like are the conditions. When establishment of the preconditions is not recognized, the processing of this time is temporarily ended.

Meanwhile, when establishment of the preconditions is recognized in the routine in FIG. 8, it is determined whether or not the internal combustion engine is under a F/C operation next (S304). The routine is for calculating the correction value of (3) described above, and therefore, when it is not recognized that the internal combustion engine is under a fuel cut operation, the processing of this time is temporarily ended.

Meanwhile, when it is recognized that the internal combustion engine is under the F/C operation in step S304, it is determined whether or not the predetermined time period elapses next (S306). Namely, it is determined whether or not the elapsed time from the time point when the operation is switched to the F/C operation exceeds a predetermined time period. The predetermined time period is set in advance with consideration being given to a delay corresponding to the capacity to the installation position of the Fr sensor 10 from the internal combustion engine 2, and is stored in the control device 14. When the lapse of the predetermined time period is not recognized, this determination processing of step S306 is repeatedly executed every fixed time period, until the lapse of the predetermined time period is recognized.

Meanwhile, when the lapse of the predetermined time period is recognized in step S306, the Fr output IF is detected next (S308). Next, it is determined whether or not the Fr output IF is detected N times (S310). When the number of detection times is not equal to or larger than N times, the flow is returned to S308 again, and until the number of detection times reaches N times, detection of the Fr output IF and the determination processing in step S310 are repeated.

Meanwhile, when it is recognized that the number of detection times of the Fr output IF reaches N times in step S310, the output average value IFA of the detected outputs IF is calculated next (S312). Next, the correction value at the lean side with respect to the true value is calculated (S314). More specifically, in accordance with expression (3) described above, the correction value K2L with respect to the true value is calculated.

Next, the correction value K2R with respect to the true value at the rich side is calculated (S316). The correction value K2R at the rich side is calculated by multiplying the correction value K2L at the lean side by the predetermined correction coefficient k, as expression (4) described above. The correction coefficient k is stored in the control device 14. Thereafter, the correction values K2L and K2R at the rich and the lean sides are both stored in the backup RAM (S318).

Figure 9:
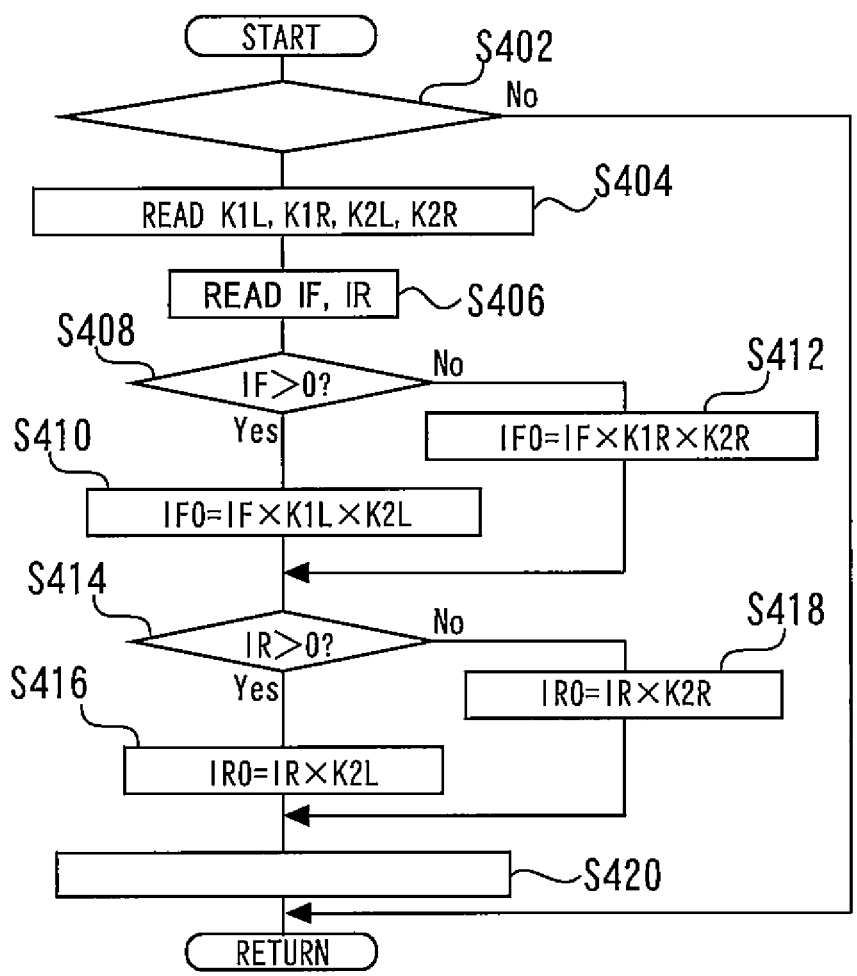
FIG. 9 is a flowchart for explaining a routine of control executed by the control device in the embodiment of the present invention.

A routine in FIG. 9 is a routine that is used when the air-fuel ratio is calculated. The routine in FIG. 9 is executed when the air-fuel ratio is calculated from the outputs of the Fr sensor 10 and the Rr sensor 12. In the routine in FIG. 9, it is firstly determined whether or not the preconditions are established (S402). The preconditions are stored in the control device 14 in advance. The specific conditions include, for example, whether it is after the start of the internal combustion engine 2, whether the Fr sensor 10 and the Rr sensor 12 are in the active state, whether or not the Fr sensor 10 or the Rr sensor 12 fails, and the like. When establishment of the preconditions is not recognized, it is predicted to be in a state where the air-fuel ratio cannot be detected correctly, and therefore, the routine of this time is temporarily ended.

Meanwhile, when establishment of the preconditions is recognized, the correction values K1L, K1R, K2L and K2R are read next (S404). The respective correction values are calculated by the routines in FIGS. 7A and 7B and FIG. 8 described above, and are stored in the backup RAM.

Next, the present Fr output IF and Rr output IR are acquired (S406). Next, it is determined whether or not the Fr output IF is larger than zero (S408). Namely, it is determined whether or not the output of the Fr sensor 10 indicates the output at the lean side.

When the Fr output IF>0 is recognized in step S408, correction of the Fr output IF by the correction value in the lean region is executed (S410). More specifically, the output correction value IF0 of the Fr sensor 10 is calculated according to arithmetic expression (5) described above.

Meanwhile, when establishment of the Fr output IF>0 is not recognized in step S408, correction of the Fr output IF by the correction value for the rich region is executed next (S412). More specifically, the output correction value IF0 of the Fr sensor 10 is calculated according to expression (6) described above.

After the output correction value IF0 of the Fr sensor 10 is calculated in step S410 or S412, it is determined whether or not the Rr output IR is larger than zero next (S414). Namely, it is determined whether or not the output of the Rr sensor 12 indicates the output at the lean side.

When establishment of the Rr output IR>0 is recognized in step S414, correction of the Rr output IR by the correction value for the lean region is executed next (S416). More specifically, the output correction value IR0 of the Rr sensor 12 is calculated according to expression (7) described above.

Meanwhile, when establishment of the Rr output IR>0 is not recognized in step S414, correction of the Rr output IR by the correction value for the rich region is executed next (S418). More specifically, by expression (8) described above, the output correction value IR0 of the Rr sensor 12 is calculated.

Next, the air-fuel ratios A/F in front and behind the catalyst 6 are calculated (S420). More specifically, the air-fuel ratio upstream of the catalyst 6 is detected, in accordance with the map which sets the relation of the sensor current of the true value and the value of the air-fuel ratio, in response to the correction value IF0 which is calculated in step S410 or S412 described above. Further, the air-fuel ratio downstream of the catalyst 6 is detected in accordance with the map which sets the relation of the sensor current of the true value and the air-fuel ratio, in response to the correction value IR0 calculated in step S416 or S418 described above. Note that here, correction for matching with the true value is applied to the correction values IF0 and IR0, and therefore, the map which is used is a conversion map of the sensor current of the true value and the air-fuel ratio, which is stored in the control device 14. Thereafter, the processing of this time is ended.

As described above, according to the present embodiment, after the circuit error is corrected and the stoichiometric points are matched with each other, correction for matching the output characteristics of the air-fuel ratio sensors in front and behind the catalyst with each other is performed, and thereafter, correction with atmosphere as the reference is further performed. Accordingly, the output characteristics of the air-fuel ratio sensors in front and behind the catalyst 6 can be matched with each other, the deviation from the true value can be corrected, and the variation of the air-fuel ratio can be corrected with higher precision.

Note that in the present embodiment, the processing of steps S204 and S212 is executed, whereby "control means" of the present invention is realized, and the processing of step S410 or S412 is executed, whereby "correction means" is realized.

Further, the processing of step S224 or S230 is executed, whereby "means for calculating the correction value" is realized, and the processing of step S410 or S412 is executed, whereby "means for correcting the output of the first air-fuel ratio sensor" is realized.

Further, the processing of step S224 or S230 is executed, whereby "means for calculating the first correction value" is realized, the processing of step S314 or S316 is executed, whereby "means for calculating the second correction value" is realized, and the processing of step S410 or S412 is executed, whereby "means for correcting the output of the first air-fuel ratio sensor" is realized.

Further, the processing of step S416 or S418 is executed, whereby "means for correcting the output of the second air-fuel ratio sensor" is realized. Further, the processing of step S316 is executed, whereby "means for calculating the third correction value" of the present invention is realized.

In the present embodiment, the case of setting the output of the Rr sensor 12 as the reference when correction for matching the output characteristics of the Fr sensor 10 and the Rr sensor 12 with each other is performed is described. This is because the Rr sensor 12 is generally considered to be more difficult to deteriorate than the Fr sensor 10. However, the present invention is not limited to this, and the output characteristics may be matched with each other by distributing the error amount of the Fr output IF and the Rr output IR to both the sensors, and correcting the outputs of the Fr sensor 10 and the Rr sensor 12. Further, the output of the Rr sensor 12 may be corrected based on the output of the Fr sensor 10.

Further, in the present embodiment, the case of using the output of the Fr sensor 10 at the time of calculation of the correction value with respect to the true value is described. This is because the exhaust gas around the Fr sensor 10 upstream of the catalyst 6 is not influenced by purification by the catalyst 6, and therefore, the Fr sensor 10 issues the output corresponding to the exhaust gas by the F/C operation earlier. However, in the present invention, the output of the Rr sensor 12 may be used at the time of calculation of the correction value with respect to the true value. In this case, after it is estimated that the OSC of the catalyst 6 reaches the saturation state after the F/C operation is started, the output of the Rr sensor 12 is detected, and the correction value may be calculated in accordance with the difference between the output and the true value.

Note that the present invention may be the control device which does not execute the circuit error for correcting the stoichiometric point. In this manner, the characteristics of the sensors can be matched with each other in front and behind the catalyst 6, and the output correction of the air-fuel ratio sensors can be performed with somewhat high precision by matching the characteristics with that of the median value product with atmosphere as the reference.

Further, in the present embodiment, the case of calculating the correction values for matching the output characteristics in both the rich and lean regions is described. However, the present invention is not limited to this, and may be the one that calculates only the correction value for the rich region or the lean region, for example, and reflects the correction value as the correction value for the other region. In this case, if the correction coefficient is obtained in accordance with the relation of the output characteristic in the rich region and the output characteristic in the lean region in advance, from the calculated correction value for the rich or lean region, the correction value for the lean or rich region opposite therefrom can be obtained.

Further, in the present embodiment, the case is described, in which the output correction coefficients K1R and K1L are calculated by performing processing by detecting the sensor output N times in the rich region (S204 to S210), detecting the sensor output N times in the lean region (S212 to S218), calculating the correction value K1R for the rich region (S220 to S224), and calculating the correction value K1L for the lean region (S226 to S230) in this sequence, in FIGS. 7A and 7B. However, the invention is not limited to this sequence, and output detection (S204 to S210) in the rich region may be performed after output detection in the lean region (S212 to S218), or, for example, the correction value K1R for the rich region may be calculated immediately (S220 to S224) after the output in the rich region is detected (S204 to S210), and the output K1L for the lean region may be calculated immediately (S226 to S230) after the output in the lean region is detected (S212 to S218).

Further, the present invention is not limited to the control device that calculates the correction values K1L and K1R for the lean region and the rich region continuously, and may be the one that separately performs the processing for calculation of the correction value K1R for the rich region (S204 to S210 and S220 to S224), and the processing for calculation of the correction value K1L for the lean region (S212 to S218 and S226 to S230) as separate routines.

Further, in the present embodiment, the case of forcefully switching the target air-fuel ratio to the rich target air-fuel ratio and the lean target air-fuel ratio for calculation of the correction values K1R and K1L is described. However, the present invention is not limited to this, and may be the one that performs the processing for calculation of the correction value K1L for the lean region (S206 to S210 and S220 to S224) when the internal combustion engine 2 is operated in the predetermined lean region, and performs the processing for calculation of the correction value K1R for the rich region (S214 to S218 and S226 to S230) when the internal combustion engine 2 is operated in the rich region. Further, the processing for calculation of the correction values K1L and K1R may be combined at timing of executing the active control for switching the air-fuel ratio forcefully to rich or lean for other control such as determination of deterioration of the catalyst 6, for example.

Further, in the present embodiment, the case is described, in which it is determined whether or not timing for detecting the Fr output IF (the first output) and the Rr output IR (the second output) arrives, that is, whether or not the catalyst 6 is brought into the state in which the catalyst 6 releases oxygen to the lower limit of the oxygen storage amount or is brought into the state in which the catalyst 6 stores oxygen to the upper limit after the target air-fuel ratio is controlled to a rich or lean target air-fuel ratio, based on whether or not the elapsed time period after the target air-fuel ratio is switched to the rich or lean target air-fuel ratio reaches the reference time period. However, the present invention is not limited to this, and the timing for detecting the first output and the second output may be determined based on other parameters with which the saturation state of the OSC of the catalyst 6 can be estimated.

More specifically, the timing for detecting the first output and the second output can be set in the time period from the time points t2 to t5 in FIG. 5, if the region is in the lean region, for example. Accordingly, for example, the detection timing may be determined based on the fact that after the output of the Rr sensor 12 is detected (or monitored), and the target air-fuel ratio is switched, the output of the Rr sensor 12 becomes equal to the output corresponding to the target air-fuel ratio, or the difference between the output of the Rr sensor 12 and the output corresponding to the target air-fuel ratio becomes so small that the output of the Rr sensor 12 is recognized as equal to the output corresponding to the target air-fuel ratio. Further, the detection timing may be determined based on the fact that the output of the Rr sensor 12 is stabilized in a state where the output of the Rr sensor 12 reaches a value in the vicinity of the output corresponding to the target air-fuel ratio, or the output of the Rr sensor 12 is stabilized in a state where the difference from the output of the Fr sensor 10 is within a predetermined value. Further, determination of the detection timing is not limited to the determination based on the output of the Rr sensor 12, and the detection timing may be determined based on whether or not the intake air amount after the target air-fuel ratio is switched to a rich or lean target air-fuel ratio reaches a reference amount.

Further, in the present embodiment, the case of setting the rich target air-fuel ratio at 14 and setting the lean target air-fuel ratio at 15 is described. As above, the rich and lean target air-fuel ratio is set in the range relatively close to the vicinity of stoichiometry, whereby the upstream and downstream sensor characteristics can be matched with each other in front and behind the catalyst in the lean and rich regions with low concentration in which the air-fuel ratio sensors are actually used, and therefore, setting the rich and lean target air-fuel ratios in this manner is effective.

However, the output of the air-fuel ratio sensor is easily detected accurately by setting the rich target air-fuel ratio and the lean target air-fuel ratio at air-fuel ratios far from stoichiometry. Accordingly, by setting the target air-fuel ratio at a target air-fuel ratio with a large difference from stoichiometry, correction may be made so that the output characteristics in a wider range are matched with each other.

Further, in the air-fuel ratio sensor, a very small difference sometimes arises in the output characteristic in the region close to stoichiometry and the region with a high concentration far from stoichiometry, for the reason of the air-fuel ratio sensor is influenced by a gas with a high diffusion speed such as hydrogen, for example, when the concentration is especially low concentration. Accordingly, for example, each of the correction value at the rich side and the correction value at the lean side may be calculated by dividing the air-fuel ratio into several sections. For example, in addition to the correction value in the case where the rich target air-fuel ratio is set to be close to 14 as described above, the correction value in the case where the rich target air-fuel ratio is set at 13 is similarly obtained, and can be stored as the map to correct the output, for each of the respective regions. Thereby, output correction corresponding to the respective regions can be performed with higher precision.

Further, in the present embodiment, the case of calculating the correction value with respect to the sensor current which is the output, and detecting the air-fuel ratio in accordance with the map from the corrected sensor current is described. However, the present invention is not limited to this. In the present invention, the relation of the value of the sensor output signal of the air-fuel ratio sensor 10 or 12 which is inputted to the control device, and the value of the air-fuel ratio which is obtained in accordance with the value of the sensor output signal and is outputted from the control device can be corrected in accordance with the respective outputs (the first output to the sixth output) which are detected at respective timings described above. Accordingly, for example, the respective correction values are obtained based on the air-fuel ratios corresponding to the outputs (the first output to the sixth output) of the air-fuel ratio sensors 10 and 12 which are detected at the respective timings described above, and by the correction values, the values of the air-fuel ratios calculated in accordance with the outputs of the air-fuel ratio sensors 10 and 12 can be corrected. Alternatively, the map, the arithmetic expression or the like which sets the relationship between the value of the sensor current and the value of the air-fuel ratio corresponding thereto is corrected, and in accordance with the corrected relationship, the air-fuel ratios may be calculated in accordance with the outputs of the air-fuel ratio sensors 10 and 12.

Further, the air-fuel ratio sensors 10 and 12 are not limited to the air-fuel ratio sensors that output sensor currents, and may be the air-fuel sensors which output voltages, for example. More specifically, the air-fuel ratio sensor in which the sensor current is converted into the voltage value by the following expression, and is detected as an output is conceivable.

$$\text{Sensor output}[V] = \text{sensor current} \times \text{circuit gain } G + 3.3\text{ V} \quad (9)$$

Here, addition of 3.3 V is a value to be a sensor output reference value at a time of the sensor current being zero, that is, the air-fuel ratio being a theoretical air-fuel ratio.

In the case as above, in calculation of the air-fuel ratio, the relationship of the sensor output (the voltage value) and the air-fuel ratio is stored in the control device 14 as the map, the function or the like in advance, and in accordance with the map or the like, the air-fuel ratio corresponding to the output can be calculated.

When the output is corrected as above, the circuit error is similarly obtained from the sensor output, and the output reference value (3.3 V) at the time of the sensor current being zero is corrected, whereby with use of the sensor output with the circuit error being corrected, the correction value can be calculated according to expressions (1) and (2) as described above.

Further, in the present embodiment, the explanation is made such that the sensor output with the circuit error being already corrected is detected as the sensor output. However, in the present invention, the timing for correction of the circuit error is not limited to this, and for example, after detection of the sensor output, the output may be corrected, or the air-fuel ratio may be corrected.

Further, in the present embodiment, the case is described, in which every time K1R, K1L, K2L, K3R, IFstg and IRstg are calculated, the respective correction values are updated to the newly calculated values, and are stored in the backup RAM. However, the invention is not limited thereto, and for example, predetermined leveling processing of averaging the respective calculated correction values and the respective correction values stored until the previous time is applied, and the average correction value may be used. Thereby, influence of error detection of the output is restrained, and the correction value with higher precision can be calculated.

Further, in the present embodiment, the case is described, in which in detection of the correction value, the respective outputs are detected N times which is the reference number of times, and the average value thereof is used. Here, in the present invention, the detected output may be directly used by setting N=1, for example. Further, N is not limited to 10, and can be properly set at a predetermined number of times that is equal to or larger than two.

Further, in the present embodiment, the case of executing correction which controls the air-fuel ratio to rich or lean after warm-up of the catalyst 6 is described. In the present invention, in addition thereto, before warm-up of the catalyst 6, the Fr output IF (the fifth output) and the Rr output IF (the sixth output) are detected, and the correction value with both the outputs combined is obtained in accordance with expressions (1) and (2), and correction may be performed by this.

It is conceivable that since an unpurified exhaust gas is also discharged downstream of the catalyst 6 before warm-up of the catalyst 6, the exhaust gas air-fuel ratio match with each other upstream and downstream of the catalyst 6. Accordingly, by performing correction at this timing, the output characteristics of the air-fuel ratio sensors 10 and 12 can be matched with each other to some extent. Further, values obtained by leveling or values obtained by averaging K1R and K1L which are calculated before warm-up of the catalyst 6 as above, and K1R and K1L which are calculated as described above after warm-up of the catalyst 6, may be used as K1R and K1L. Correction before warm-up of the catalyst 6 is also added as above, the opportunity of learning the correction values of the air-fuel ratio sensors 10 and 12 can be increased, and air-fuel ratio control and control of catalyst deterioration determination can be executed with higher precision. Further, by adding correction in the rich and lean regions after warm-up of the catalyst 6 as in the present embodiment, correction of the output characteristics in front and behind the catalyst 6 can be performed with high precision, as compared with the case with only correction before warm-up of the catalyst 6.

Note that when the numbers such as the number, the quantity, the amount, and the range of the respective elements are mentioned in the above embodiment, the present invention is not limited to the mentioned numbers except for the case where it is specially mentioned clearly, or in the case where the number is clearly specified to be the number theoretically. Further, the structure and the like described in the embodiment are not always essential in the invention except for the case it is specially mentioned clearly, or in the case where the structures and the like are obviously specified to be the structures and the like theoretically.

REFERENCE SIGNS LIST

2 Internal combustion engine
6 Catalyst
10 Air-fuel ratio sensor (Fr sensor/First air-fuel ratio sensor)
12 Air-fuel ratio sensor (Rr sensor/Second air-fuel ratio sensor)
14 Control device

The invention claimed is:

1. A control device for an internal combustion engine that includes a catalyst installed in an exhaust path and having an oxygen storage capacity, a first air-fuel ratio sensor installed upstream of the catalyst, a second air-fuel ratio sensor installed downstream of the catalyst, and control means for controlling an air-fuel ratio of the internal combustion engine to a rich air-fuel ratio that is richer than a theoretical air-fuel ratio, or a lean air-fuel ratio that is leaner than the theoretical air-fuel ratio, the control device comprising:
    detection means for detecting a first output that is an output of the first air-fuel ratio sensor, and a second output that is an output of the second air-fuel ratio sensor, in a state that is determined as reaching a first state where the catalyst stores oxygen to an upper limit of an oxygen storage amount after the air-fuel ratio is switched to the lean air-fuel ratio from the rich air-fuel ratio, or a second state where the catalyst releases oxygen to a lower limit of the oxygen storage amount after the air-fuel ratio is switched to the rich air-fuel ratio from the lean air-fuel ratio;
    correction means for correcting a first relation of the output of the first air-fuel ratio sensor, and a value of an air-fuel ratio that is calculated in accordance with the output of the first air-fuel ratio sensor, based on a first difference between the first output and the second output; and
    means for executing a fuel cut operation by stopping fuel supply to the internal combustion engine,
    the correction means further corrects the first relation in response to a second difference between a reference value of a theoretical output of the first air-fuel ratio sensor in atmosphere, and a third output that is an output of the first air-fuel ratio sensor that is detected during the fuel cut operation; and
    the control means controls the air-fuel ratio of the internal combustion engine based on the corrected first relation.

2. The control device for an internal combustion engine according to claim 1,
    wherein the correction means
    corrects the first relation in a region where the air-fuel ratio is rich, in response to the first difference calculated from the first output and the second output which are detected in a state where the air-fuel ratio is controlled to the rich air-fuel ratio, and
    corrects the first relation in a region where the air-fuel ratio is lean, in response to the first difference calculated from the first output and the second output which are detected in a state where the air-fuel ratio is controlled to the lean air-fuel ratio.

3. The control device for an internal combustion engine according to claim 1,
    wherein the correction means further corrects a second relation of an output of the second air-fuel ratio sensor, and a value of an air-fuel ratio that is calculated in accordance with the output of the second air-fuel ratio sensor, in response to the second difference, and the control means controls the air-fuel ratio of the internal combustion engine based on the first and second relations.

4. The control device for an internal combustion engine according to claim 1,
wherein the correction means
corrects the first relation or the second relation in a region where the air-fuel ratio is lean, in response to the second difference, and
corrects the first relation or the second relation in a region where the air-fuel ratio is rich, from a correction coefficient that is set in advance in accordance with an output characteristic in a rich region with respect to an output characteristic in a lean region, and the second difference, and the control means controls the air-fuel ratio of the internal combustion engine based on the first and second relations.

5. The control device for an internal combustion engine according to claim 1,
wherein when a reference time period elapses, after the air-fuel ratio is switched to the lean air-fuel ratio from the rich air-fuel ratio, or after the air-fuel ratio is switched to the rich air-fuel ratio from the lean air-fuel ratio, it is determined that the catalyst reaches the first state, or the catalyst reaches the second state.

6. The control device for an internal combustion engine according to claim 1,
wherein when the output of the second air-fuel ratio sensor reaches an output corresponding to the lean air-fuel ratio after the air-fuel ratio is switched to the lean air-fuel ratio from the rich air-fuel ratio, or when the output of the second air-fuel ratio sensor reaches an output corresponding to the rich output after the air-fuel ratio is switched to the rich air-fuel ratio from the lean air-fuel ratio, it is determined that the catalyst reaches the first state, or that the catalyst reaches the second state.

7. An internal combustion engine comprising:
a catalyst installed in an exhaust path and having an oxygen storage capacity;
a first air-fuel ratio sensor installed upstream of the catalyst;
a second air-fuel ratio sensor installed downstream of the catalyst;
a controller programmed to control an air-fuel ratio of the internal combustion engine to a rich air-fuel ratio that is richer than a theoretical air-fuel ratio, or a lean air-fuel ratio that is leaner than the theoretical air-fuel ratio, the controller further programmed to:
(i) detect a first output that is an output of the first air-fuel ratio sensor, and a second output that is an output of the second air-fuel ratio sensor, in a state that is determined as reaching a first state where the catalyst stores oxygen to an upper limit of an oxygen storage amount after the air-fuel ratio is switched to the lean air-fuel ratio from the rich air-fuel ratio, or a second state where the catalyst releases oxygen to a lower limit of the oxygen storage amount after the air-fuel ratio is switched to the rich air-fuel ratio from the lean air-fuel ratio, and
(ii) correct a first relation of the output of the first air-fuel ratio sensor, and a value of an air-fuel ratio that is calculated in accordance with the output of the first air-fuel ratio sensor, based on a difference between the first output and the second output; and
execute a fuel cut operation by stopping fuel supply to the internal combustion engine, the controller is further programmed to: further correct the first relation in response to a second difference between a reference value of a theoretical output of the first air-fuel ratio sensor in atmosphere, and a third output that is an output of the first air-fuel ratio sensor that is detected during the fuel cut operation; and
control the air-fuel ratio of the internal combustion engine based on the corrected first relation.

8. A control device for an internal combustion engine that includes a catalyst installed in an exhaust path and having an oxygen storage capacity, a first air-fuel ratio sensor installed upstream of the catalyst, a second air-fuel ratio sensor installed downstream of the catalyst, and control means for controlling an air-fuel ratio of the internal combustion engine to a rich air-fuel ratio that is richer than a theoretical air-fuel ratio, or a lean air-fuel ratio that is leaner than the theoretical air-fuel ratio, the control device comprising:
detection means for detecting a first output that is an output of the first air-fuel ratio sensor, and a second output that is an output of the second air-fuel ratio sensor, in a state that is determined as reaching a first state where the catalyst stores oxygen to an upper limit of an oxygen storage amount after the air-fuel ratio is switched to the lean air-fuel ratio from the rich air-fuel ratio, or a second state where the catalyst releases oxygen to a lower limit of the oxygen storage amount after the air-fuel ratio is switched to the rich air-fuel ratio from the lean air-fuel ratio; and
correction means for correcting a first relation of the output of the first air-fuel ratio sensor, and a value of an air-fuel ratio that is calculated in accordance with the output of the first air-fuel ratio sensor, based on a first difference between the first output and the second output,
the correction means further corrects the first relation, in response to a third difference between a fourth output that is an output of the first air-fuel ratio sensor, and a fifth output that is an output of the second air-fuel ratio sensor, that are detected in a state before the catalyst reaches a reference activation temperature, and the first difference; and
the control means controls the air-fuel ratio of the internal combustion engine based on the corrected first relation.

9. The control device for an internal combustion engine according to claim 8,
wherein the correction means
corrects the first relation in a region where the air-fuel ratio is rich, in response to the first difference calculated from the first output and the second output which are detected in a state where the air-fuel ratio is controlled to the rich air-fuel ratio, and
corrects the first relation in a region where the air-fuel ratio is lean, in response to the first difference calculated from the first output and the second output which are detected in a state where the air-fuel ratio is controlled to the lean air-fuel ratio.

10. The control device for an internal combustion engine according to claim 8,
wherein the correction means further corrects a second relation of an output of the second air-fuel ratio sensor, and a value of an air-fuel ratio that is calculated in accordance with the output of the second air-fuel ratio sensor, in response to the second difference, and the control means controls the air-fuel ratio of the internal combustion engine based on the first and second relations.

11. The control device for an internal combustion engine according to claim 8, wherein the correction means
corrects the first relation or the second relation in a region where the air-fuel ratio is lean, in response to the second difference, and
corrects the first relation or the second relation in a region where the air-fuel ratio is rich, from a correction coefficient that is set in advance in accordance with an output characteristic in a rich region with respect to an output characteristic in a lean region, and the second difference, and the control means controls the air-fuel ratio of the internal combustion engine based on the first and second relations.

12. The control device for an internal combustion engine according to claim 8,
wherein when a reference time period elapses, after the air-fuel ratio is switched to the lean air-fuel ratio from the rich air-fuel ratio, or after the air-fuel ratio is switched to the rich air-fuel ratio from the lean air-fuel ratio, it is determined that the catalyst reaches the first state, or the catalyst reaches the second state.

13. The control device for an internal combustion engine according to claim 8,
wherein when the output of the second air-fuel ratio sensor reaches an output corresponding to the lean air-fuel ratio after the air-fuel ratio is switched to the lean air-fuel ratio from the rich air-fuel ratio, or when the output of the second air-fuel ratio sensor reaches an output corresponding to the rich output after the air-fuel ratio is switched to the rich air-fuel ratio from the lean air-fuel ratio, it is determined that the catalyst reaches the first state, or that the catalyst reaches the second state.

14. An internal combustion engine comprising:
a catalyst installed in an exhaust path and having an oxygen storage capacity;
a first air-fuel ratio sensor installed upstream of the catalyst;
a second air-fuel ratio sensor installed downstream of the catalyst; and
a controller programmed to control an air-fuel ratio of the internal combustion engine to a rich air-fuel ratio that is richer than a theoretical air-fuel ratio, or a lean air-fuel ratio that is leaner than the theoretical air-fuel ratio, the controller further programmed to:
  (i) detect a first output that is an output of the first air-fuel ratio sensor, and a second output that is an output of the second air-fuel ratio sensor, in a state that is determined as reaching a first state where the catalyst stores oxygen to an upper limit of an oxygen storage amount after the air-fuel ratio is switched to the lean air-fuel ratio from the rich air-fuel ratio, or a second state where the catalyst releases oxygen to a lower limit of the oxygen storage amount after the air-fuel ratio is switched to the rich air-fuel ratio from the lean air-fuel ratio, and
  (ii) correct a first relation of the output of the first air-fuel ratio sensor, and a value of an air-fuel ratio that is calculated in accordance with the output of the first air-fuel ratio sensor, based on a difference between the first output and the second output,
the controller is further programmed to: correct the first relation, in response to a third difference between a fourth output that is an output of the first air-fuel ratio sensor, and a fifth output that is an output of the second air-fuel ratio sensor, that are detected in a state before the catalyst reaches a reference activation temperature, and the first difference; and
control the air-fuel ratio of the internal combustion engine based on the corrected first relation.

* * * * *